United States Patent Office 3,009,570
Patented Nov. 21, 1961

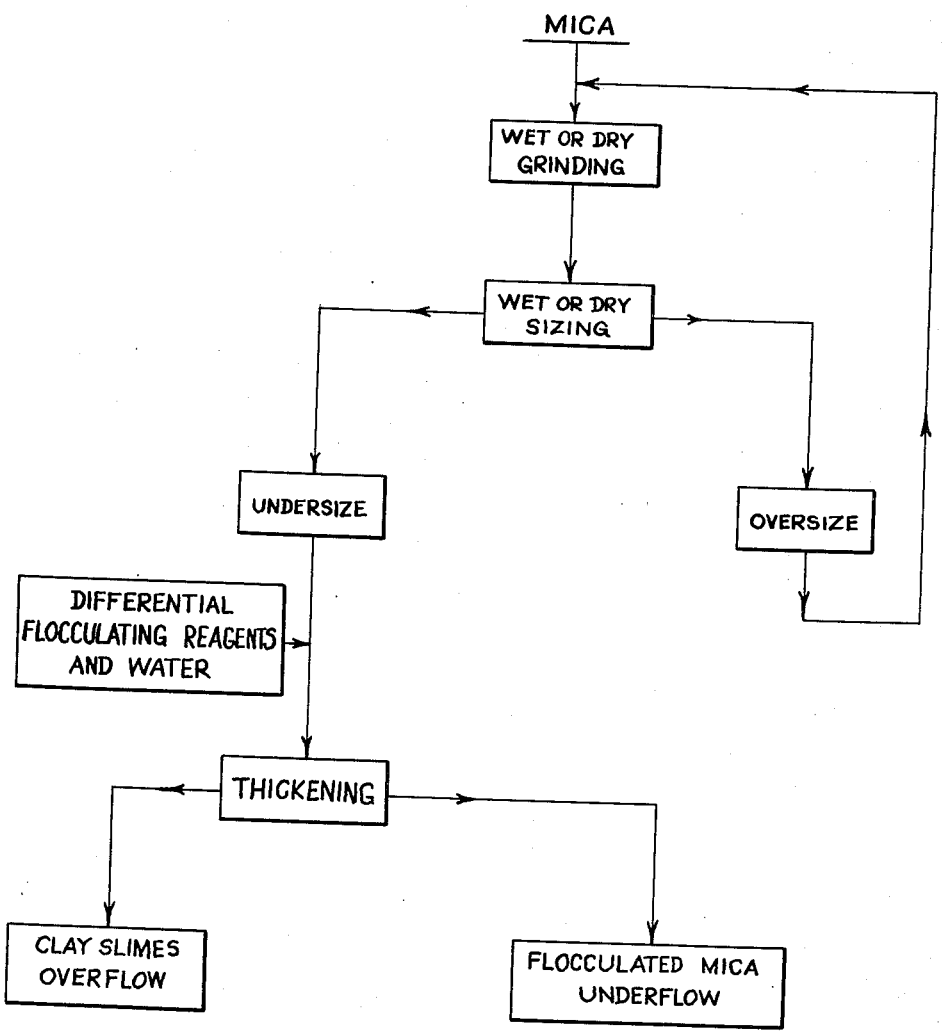
Hugh A. Lancaster
William A. Faust
INVENTORS

3,009,570
PROCESS FOR ELIMINATING CLAY
SLIMES FROM MICA
Hugh A. Lancaster, Kings Mountain, and William A. Faust, Asheville, N.C., assignors to Kings Mountain Mica Company, Kings Mountain, N.C., a corporation of North Carolina
Filed Dec. 2, 1957, Ser. No. 700,035
5 Claims. (Cl. 209—5)

The present invention relates to a process for eliminating clay slimes from mica while at the same time effecting a thickening of the resulting clean mica. The process of the present invention is particularly useful in the removal of clay slimes from micas after their liberation by previous wet or dry grinding.

The term "clay slimes" as used in the instant application refers to clay resulting from the decomposition of feldspar, iron oxides and other inorganic colloidal materials.

In the production of mica by concentration methods such as treatment in a standard Humphrey's spiral concentration as practiced for example at Kings Mountain, North Carolina, or from mining of high-grade mica concentrations, the resulting material has a certain amount of clay slimes left between the laminae of the mica. These clay slimes have the effect of giving poor color and low light reflectance to the mica product. The elimination of these clay slimes makes for a superior product for the consuming industries.

Present practice in the ground mica industry is to employ simple intermittent settling and decantation following batch wet grinding to separate clay slimes from the ground mica, such practice resulting, however, in high costs plus considerable loss of fine mica. In ordinary dry grinding practice, no removal of the clay is made, except by sometimes screening out the extreme fines produced, also incurring considerable losses of fine mica.

It is therefore a primary object of the present invention to provide a simple and economically feasible process for removing clay slimes from mica.

A further object of the present invention is to provide a process for removing clay slimes from various micaceous materials such as muscovite and biotite mica, vermiculite, chlorite and the like.

A still further object of the present invention is to provide a process for producing mica with improved color and increased light reflectance.

Further objects and advantages of the present invention will become apparent as the description proceeds, and the features of novelty will be defined in particularity in the appended claims.

The process of the present invention will be understood more readily by reference to the accompanying drawing which is a self-explanatory diagrammatic flow sheet of the improved process, illustrating the successive steps thereof.

Referring to the accompanying flow sheet drawing, it will be seen that the present invention generally comprises a process for eliminating clay slimes from mica which is achieved by adding a selective flocculant to a slurry of mica, clay slimes, and water, causing selective flocculation of the mica and dispersion of the clay slimes.

The treated slurry is introduced into a thickener and the settled flocculated mica is removed from the bottom while the clay slimes and excess water are overflowed, both operations being continuous.

As is indicated on the accompanying flow sheet, the mica to be treated by the present improved process has first been ground, the grinding being carried out until the mica preferably passes a −40 mesh screen, although material of any size that can be handled in the separating vessel may be treated in accordance with the present process. Grinding in an alkali phosphate solution is preferred, but such is not necessary to the success of the present process.

The mica which has been ground preferably to −40 mesh by either wet or dry grinding procedure is passed to a sizing stage wherein undersized particles are conveyed to the next stage of the procedure, while the oversized particles are returned to the grinding stage for further reduction.

The undersized ground particles that is, those particles of −40 mesh for example, are treated by the addition of selective flocculants which cause a flocculation of the mica particles and the dispersion of the clay slimes associated therewith. The selective flocculants employed for this purpose may be any of several types, such as anionic or cationic polyelectrolytes, either singly or in combination, all classes of starches, either natural or modified by causticizing or other treatment, or the cationic derivatives of starches, or various water-soluble vegetable colloids. All of these are effective at a pH of 6.4 or higher. Following addition of the selective flocculant, the flocculated product is thickened, the clay slimes representing the overflow from the thickener, while the flocculated mica is the underflow.

The point and manner of addition of the selective flocculant are variable but a stage addition of reagent immediately preceding the thickening step is preferred. The degree and duration of agitation of the treated slurry ahead of the thickening step depend upon the characteristics of the micaceous materials.

In carrying out the process of the present invention, in an illustrative laboratory embodiment of the process, 1000 cc. of a mica slurry, adjusted to 5% solids by dilution with water were placed in a 1000 cc. graduated cylinder. The selective flocculant or flocculants were added and the whole mixed by upending the cylinder six times. The time for the top of the flocculated mica to reach a predetermined level was recorded in order to calculate settling rates. The suspended clay slimes were drawn off after ten minutes, and this fraction, and the flocculated mica were dried and weighed separately to calculate the mica weight recovery. Standards for comparison were run with no reagents to simulate normal practice. Color checks were run on the clean product with a standard photoelective reflection meter.

Table I below indicates the results of the tests with all the reagent quantities being set forth on the basis of pounds per ton of original mica plus clay slimes. Samples 1, 3, 5, and 6 of Table I were wet-ground special concentrates. The "mica schist" sample was wet ground flotation concentrate.

*Table I*

SAMPLE NO. 1

| Size of feed | Reagent | Pounds Per Ton | Settling Rate, Ft./Hr. | Percent Weight Material Settled | Average of color Reading of Settled Mica |
|---|---|---|---|---|---|
| −40 Mesh | None | | 2.3 | 63.8 | 64.3 |
| Do | Separan 2610 | 1.2 | 4.8 | 94.0 | 67.7 |

SAMPLE NO. 3

| −40 Mesh | None | | 2.3 | 70.0 | 65.7 |
| Do | Separan 2610 | 0.6 | 9.3 | 94.0 | 69.3 |
| Do | Aerofloc 3000 | 1.2 | 6.2 | 93.5 | 69.3 |
| Do | Aerofloc 3171 | 0.7 | 13.1 | 86.4 | 69.3 |
| Do | Caust. Starch | 1.6 | 10.3 | 87.3 | 71.0 |

SAMPLE NO. 5

| | | | | | |
|---|---|---|---|---|---|
| −40 Mesh | None | | 2.3 | 60.8 | 66.5 |
| Do | Separan 2610 | 0.5 | 4.5 | 94.5 | 70.5 |
| Do | Burtonite | 1.8 | 4.8 | 90.9 | 71.2 |

SAMPLE NO. 6

| | | | | | |
|---|---|---|---|---|---|
| −150 | None | | 2.3 | 47.3 | 66.0 |
| Do | Aerofloc 3000 | 1.0 | 2.3 | 78.6 | 75.7 |
| Do | Separan 2610 | 1.2 | 2.3 | 78.8 | 75.2 |
| Do | {Aerofloc 3000 / Lytron 886} | {1.0 / 1.0} | 2.3 | 75.0 | 74.0 |

MICA SCHIST

| | | | | | |
|---|---|---|---|---|---|
| −325 Mesh | None | | 0.2 | 81.3 | 64.0 |
| Do | Caust. Starch | 0.7 | 5.0 | 77.6 | 66.2 |

Separan 2610 is a water-soluble cationic polyacrylamide polyelectrolyte manufactured by the Dow Chemical Company, Midland, Michigan.

Aerofloc 3000 is a water-soluble cationic polyacrylamide polyelectrolyte manufactured by the American Cyanamid Company, New York, New York.

Burtonite is a water-soluble nonionic polyuronide prepared from guar seeds and is manufactured by the Burtonite Company, Nutley, New Jersey.

Lytron 886 is a water-soluble anionic polymethacrylate salt polyelectrolyte manufactured by the Monsanto Chemical Company, Springfield, Massachusetts.

From the examples shown in Table I, it will be seen that the disclosed process of selective flocculation and dispersion together with subsequent thickening successfully eliminates clay slimes from mica, resulting in a notable color improvement as compared with usual methods of treatment, together with a suitable yield of clean mica. The instant process causes the micaceous particles to settle much more rapidly than they do when in the dispersed condition necessary in conventional clay removal procedures. Therefore, in continuous operations, the present process requires proportionately smaller classifiers or thickeners for concentrating the mica than do other methods.

It is pointed out that the amount of reagent to make an effective separation will vary not only with the reagent employed, but with the type of mica and its previous treatment, if any. In general, however, it may be stated that from about 0.5 to 2.0 pounds of flocculant per ton of solids in the slurry will provide very satisfactory results. Further, it has been found that with the preferred flocculants such as Separan 2610 or Aerofloc 3000 as little as from 0.5 to 1.2 pounds of the flocculant per ton of solids will effectively produce differential flocculation and dispersion.

Having thus described the invention what is desired protected by Letters Patent is as set forth in the following claims:

1. A process for treating comminuted mica particles for cleanly separating small minor amounts of clay slimes therefrom which comprises sizing the particles, separating oversize from undersize particles, returning oversize particles to a comminuting stage, adding to a slurry of undersize particles in water a water-soluble selective differential flocculating reagent selected from the group consisting of a cationic polyacrylamide, an anionic polymethacrylate salt, a nonionic polyuronide, and causticized starch, for flocculating the mica particles and dispersing the clay slimes, said flocculating reagent being employed in a range of approximately 0.5 to 2.0 pounds of reagent per ton of solids in the slurry, thickening the resulting material, removing the dispersed clay slimes as an overflow from the thickening, and collecting the flocculated mica particles as an underflow from the thickening.

2. A process as claimed in claim 1, wherein the selective mica flocculating reagent is a cationic polyacrylamide polyelectrolyte.

3. A process as claimed in claim 1 wherein the selective mica flocculating reagent is causticized starch.

4. A process as claimed in claim 1, wherein the selective mica flocculating reagent is a water-soluble nonionic polyuronide.

5. A process as claimed in claim 1, wherein the mica particles in the slurry are not larger than approximately −40 mesh.

References Cited in the file of this patent

UNITED STATES PATENTS

| | | |
|---|---|---|
| 2,303,962 | Tartaron et al. | Dec. 1, 1942 |
| 2,394,083 | Lintz | Feb. 5, 1946 |
| 2,660,303 | Haseman | Nov. 24, 1953 |

FOREIGN PATENTS

| | | |
|---|---|---|
| 108,808 | Great Britain | Aug. 13, 1917 |

OTHER REFERENCES

Taggart: Handbook of Mineral Dressing, 1945, page 15–06.

Soil Science, volume 73, number 6, June 1952, pages 485–492.

Taggart: Handbook of Mineral Dressing, 1945, pages 12–127.

Taggart: Handbook of Mineral Dressing, 1945, section 12, page 24.